US012652427B2

(12) United States Patent     (10) Patent No.:   US 12,652,427 B2

Rizzuto et al.     (45) Date of Patent:    Jun. 9, 2026

(54) LOGGING AND DEBUGGING OF STREAMING APPLICATIONS

(71) Applicant: NBCUniversal Media, LLC, New York, NY (US)

(72) Inventors: Alex Rizzuto, Hoboken, NJ (US); Sangeeta Prakash, Dana Point, CA (US); Christian Willett, North Hollywood, CA (US); Randolph Todd Rimes, Douglas, GA (US)

(73) Assignee: NBCUniversal Media, LLC, New York, NY (US)

( * ) Notice: Subject to any disclaimer, the term of this patent is extended or adjusted under 35 U.S.C. 154(b) by 1 day.

(21) Appl. No.: 18/812,499

(22) Filed: Aug. 22, 2024

(65) Prior Publication Data

US 2026/0059155 A1    Feb. 26, 2026

(51) Int. Cl.

| | |
|---|---|
| *H04N 21/24* | (2011.01) |
| *H04N 21/239* | (2011.01) |
| *H04N 21/254* | (2011.01) |
| *H04N 21/262* | (2011.01) |
| *H04N 21/81* | (2011.01) |

(52) U.S. Cl.

CPC ..... *H04N 21/2408* (2013.01); *H04N 21/2393* (2013.01); *H04N 21/254* (2013.01); *H04N 21/26258* (2013.01); *H04N 21/812* (2013.01)

(58) Field of Classification Search

CPC .......... H04N 21/2408; H04N 21/2393; H04N 21/254; H04N 21/26258; H04N 21/812

See application file for complete search history.

(56) References Cited

U.S. PATENT DOCUMENTS

| | | | |
|---|---|---|---|
| 9,426,542 B1 * | 8/2016 | Gottlieb | H04N 21/84 |
| 11,463,788 B1 * | 10/2022 | Chattopadhyay | H04N 21/84 |
| 2013/0268963 A1 * | 10/2013 | Nugent | H04N 21/812 |
| | | | 725/32 |
| 2014/0150019 A1 * | 5/2014 | Ma | H04N 21/458 |
| | | | 725/34 |
| 2015/0222961 A1 | 8/2015 | Hardie et al. | |
| 2015/0382075 A1 * | 12/2015 | Neumeier | G06F 16/7847 |
| | | | 725/34 |
| 2016/0330524 A1 * | 11/2016 | Wang | H04N 21/4826 |
| 2017/0070784 A1 * | 3/2017 | Massoudi | H04N 21/47217 |
| 2017/0252011 A1 * | 9/2017 | Abe | A61B 5/349 |
| 2018/0054658 A1 | 2/2018 | Neumeier et al. | |
| 2019/0215556 A1 | 7/2019 | Nugent et al. | |

(Continued)

OTHER PUBLICATIONS

Purra Joel et al.: "Third-Party Tracking 14 H04L on the Web: A Swedish Perspective", G06Q 2016 IEEE 41ST Conference On Local Computer Networks (LCN), IEEE, Nov. 7, 2016 (Nov. 7, 2016), pp. 28-34, XP033029503, Doi: 10.1109/LCN.2016.14 [retrieved on Dec. 22, 2016].

(Continued)

*Primary Examiner* — Timothy R Newlin

(74) *Attorney, Agent, or Firm* — Fletcher Yoder, P.C.

(57) ABSTRACT

Systems and methods for logging OTT device requests and responses are provided. A method may include intercepting, via a logging system, one or more ad requests to be satisfied by an ad server. Data of the ad requests is logged, via the logging system. The request is forwarded to the ad server, which may respond with an ad server response that may also be logged by the logging system.

20 Claims, 5 Drawing Sheets

(56)                   References Cited

U.S. PATENT DOCUMENTS

| | | | |
|---|---|---|---|
| 2020/0128305 A1 | 4/2020 | Romrell et al. | |
| 2020/0219129 A1* | 7/2020 | Andrades | G06Q 30/0246 |
| 2020/0296433 A1* | 9/2020 | Gutman | H04N 21/26258 |
| 2021/0314643 A1* | 10/2021 | Levin | G06Q 30/0241 |
| 2022/0150414 A1* | 5/2022 | Almehmadi | G06V 10/62 |
| 2022/0329888 A1* | 10/2022 | Fairchild | G06Q 30/0246 |
| 2023/0367833 A1 | 11/2023 | Kol et al. | |
| 2025/0142140 A1* | 5/2025 | El-Rahman | H04N 21/8456 |
| 2025/0193482 A1* | 6/2025 | Arbel | H04N 21/4532 |

OTHER PUBLICATIONS

European Search Report; EP Application No. 25197419; dated Jan. 5, 2026.

* cited by examiner

400

| RECEIVE PIXEL EVENT FROM CLIENT LOG | ~402 |

| GENERATE & PROVIDE, TO CLIENT, TRACKING REDIRECT TO TRACKING SERVER | ~404 |

LOGGING AND DEBUGGING OF STREAMING APPLICATIONS

BACKGROUND

The present disclosure relates generally to improved systems and techniques for quality assurance and debugging capabilities for over-the-top (OTT) video applications and devices. For example, the present disclosure describes modifying ad requests to capture HTTP requests, payloads, and responses, resulting in, among other things, increased identification and diagnoses of problems associated with content (e.g., advertisement) distribution and tracking.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Traditional content network distribution involves linear television distribution where content files are played live and centrally so that the output may be distributed to individual stations. Stations, in turn, traditionally integrate this linear video with additional local video to create a local television broadcast. However, as the network distribution paradigm continues to shift, migrating from the linear television distribution paradigm to a cloud distribution paradigm, a need exists to develop new non-linear manifest-manipulated techniques for content distribution. In the cloud distribution paradigm, a manifest (or a playlist) is delivered to a user device, allowing the user device to receive chunks or fragments of encoded content and then decode and play the content.

Content providers often use quality control systems to monitor properties of content (e.g., advertisements or any other media content) before and after being deployed on the user device. Quality control systems may monitor content requests (e.g., ad requests) and content responses (e.g., ad responses) based on technical requirements and monitor content based on quality requirements and subsequently deactivate and/or debug problematic content requests/responses and content when the problematic content does not meet certain thresholds or requirements of the content presentation services. Unfortunately, content and content requests/responses are oftentimes involve third-party servers (e.g., servers of third-party advertisers, third-party vendors) within the cloud distribution paradigm. Therefore, monitoring hypertext transfer protocol (HTTP) request details within the cloud distribution paradigm is not efficient and may result in a loss of time, resources, and revenue for content providers. Therefore, an approach is needed to monitor content requests/responses and quality of content at or near real time. In particular, deactivation and/or debugging of problematic content and content requests/responses, may protect revenue of content providers from losses in monetization due to problematic content or content requests/responses interfering with content streams.

BRIEF DESCRIPTION

Certain aspects commensurate in scope with the originally claimed subject matter are summarized below. These aspects are not intended to limit the scope of the claimed subject matter, but rather these aspects are intended only to provide a brief summary of possible forms of the subject matter. Indeed, the subject matter may encompass a variety of forms that may be similar to or different from the aspects set forth below.

In one aspect a method may include receiving, via a logging system, one or more ad requests, logging, via the logging system, data associated with the one or more ad requests, directing the one or more ad requests to an ad server, receiving one or more ad responses based on the one or more ad requests, and modifying the one or more ad responses.

In one aspect, a system may include processing circuitry and memory, accessible by the processing circuitry, the memory storing instructions that, when executed by the processing circuitry, cause the processing circuitry to perform operations including receiving, via a logging system, one or more ad requests, logging, via the logging system, data associated with the one or more ad requests, directing the one or more ad requests to an ad server, receiving one or more ad responses based on the one or more ad requests, and modifying the one or more ad responses.

In one aspect, a non-transitory computer-readable storage medium may be provided that includes processor-executable routines that, when executed by processing circuitry, cause the processing circuitry to perform including receiving, via a logging system, one or more ad requests, logging, via the logging system, data associated with the one or more ad requests, directing the one or more ad requests to an ad server, receiving one or more ad responses based on the one or more ad requests, and modifying the one or more ad responses.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 6 is a schematic diagram of a graphical user interface (GUI) of the API of FIG. 5 depicted as displayed on a screen, in accordance with aspects of the present techniques.

DETAILED DESCRIPTION

Figure 1:
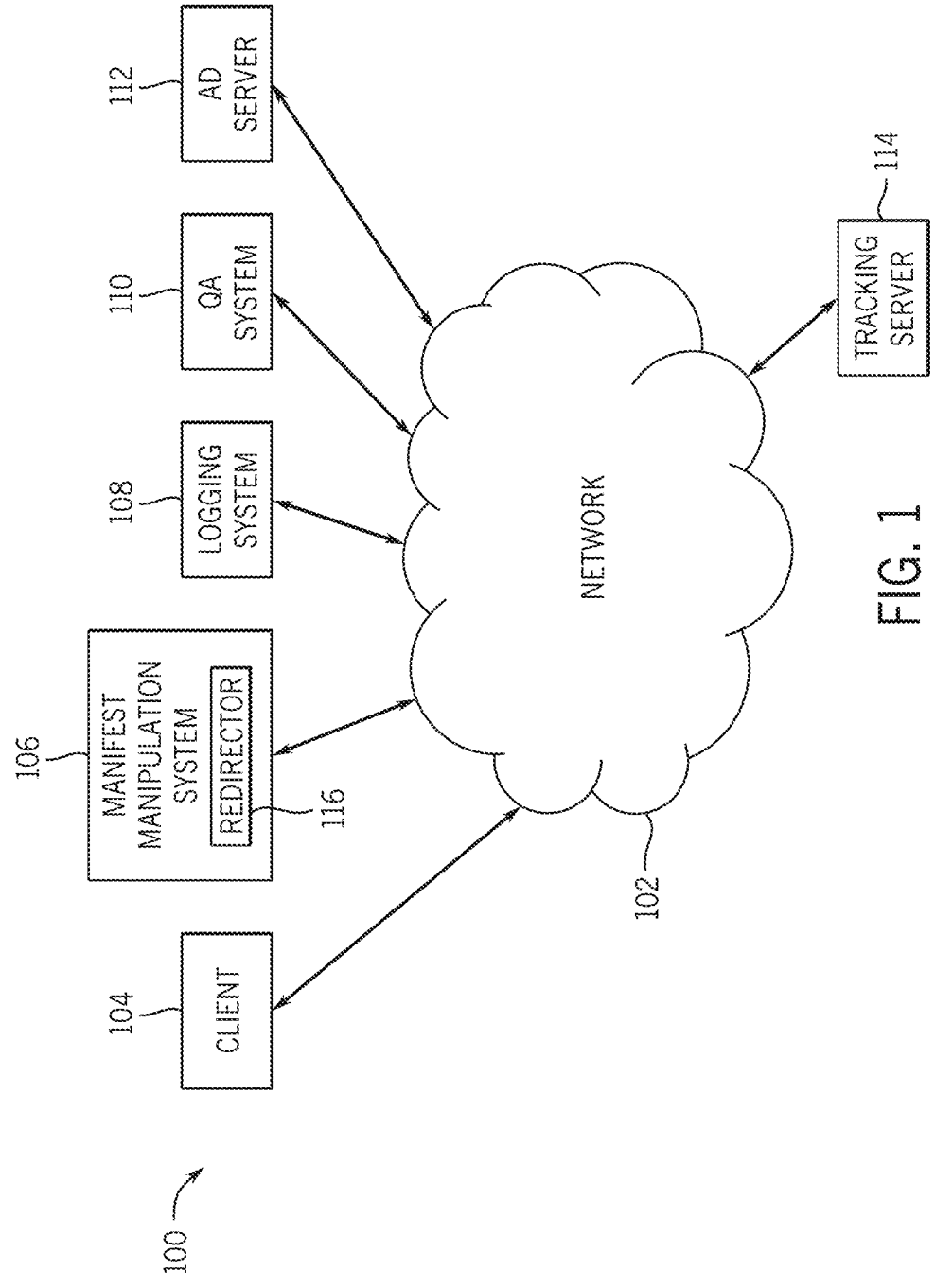
FIG. 1 is a diagram, illustrating a system having a cloud architecture in which aspects of the present techniques may operate including a manifest manipulation system.

One or more specific aspects of the present disclosure will be described below. In an effort to provide a concise description of these aspects, all features of an actual implementation may not be described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various aspects of the present disclosure, the articles "a," "an," "the," and "said" are intended to mean that there are one or more of the elements. The terms "comprising," "including," and "having" are intended to be inclusive and mean that there may be additional elements other than the listed elements.

As discussed in greater detail below, the present aspects described herein facilitate and improve the monitoring of content requests/responses and a quality of content (e.g., advertisements, commercial notices, marketing content, or another suitable secondary media content) in an over the top (OTT) environment. In conventional OTT environments, secondary media content (e.g., ads) may be integrated (e.g., ad integration) into primary content via an ad server (e.g., ad seller). For example, a manifest may include segments with a location indication of the associated content segments and playback timings including segment times associated with secondary content. As such, secondary media content may be automatically (e.g., algorithmically) integrated within designated segments of the manifest without intervention from a publisher (e.g., primary content provider). For instance, an ad space segment present in the manifest may be bought and sold, resulting in selection of secondary media content to fill the ad space segment. In this way, secondary media content may be run on a publisher's content presentation service (e.g., streaming service). Traditionally, in order to determine whether a content request or a content response is accurate, a network device proxying on the same local network where a device with the OTT application is needed. Such independent analysis of the content requests and responses via the network proxy results in siloed quality control checks that may impact the quality of the secondary media content when integrated on the publisher's content presentation service. As such, there is a need for centralized quality assurance and debugging, without a "man-in-the-middle" proxying of local networks and device traffic.

Accordingly, the presently disclosed techniques may be used to improve techniques for ensuring efficient and accurate integration of secondary media content within manifests of OTT environments. A manifest manipulation system is described herein that enables integration and compatibility of externally hosted secondary media content within a content presentation service of an enterprise. In this manner, seamless integration of secondary media content may be offered, providing content for display via client devices, while quality control and/or debugging of viewership may be controlled in a background of the content presentation service. The manifest manipulation system may also ensure secondary media content integration within networks and/or devices with secure sockets layer (SSL) certificates, transport layer security (TSL) certificates, device-specific limitations, operating systems, and the like. In this manner, the manifest manipulation system may rewrite requests (e.g., HTTP requests) to enable logging of requests and responses associated with the secondary media content while preserving original request data to allow OTT video playback of the secondary media content. As such, the manifest manipulation system may enable proxying of network traffic from a content presentation service and an ad server without proxying local network traffic.

In particular, present aspects include generating modified secondary media content requests (e.g., modified ad requests) and modified secondary media content responses that may be logged via a logging system. The modified ad requests may include one or more pixel events configured to track the properties associated with the secondary media content. The pixel events may be logged and stored in a tracking server. The pixel events may then be redirected to the secondary media content provider. As such, rewriting of requests may provide near real time quality information associated with the secondary media content to provide near real time debugging, improving overall content quality. In this way, identification and diagnostics of bugs associated with ad requests and/or ad responses may be directly integrated within the OTT environment, without dependence on traditional limitations relating to SSL certificates, device-specific challenges, and the like.

With the preceding in mind, the following figures relate to systems and processes for secondary media content request and response modifications and event pixel logging. Turning now to FIG. 1, a diagram is shown illustrating a system 100 for secondary media content request and response modification via a network 102, in accordance with certain aspects of the current application. The network 102 may include one or more computing networks, such as local private networks (LAN), wide area networks (WAN), the Internet, and/or other remote networks, to transfer data between a client 104 and the network hosting the system 100. Each of the computing networks within network 102 may contain wired and/or wireless programmable devices that operate in the electrical and/or optical domain. For example, network 102 may include wireless networks, such as cellular networks (e.g., Global System for Mobile Communications (GSM) based cellular network), and/or other suitable networks. The network 102 may also employ any number of network communication protocols, such as Transmission Control Protocol (TCP) and Internet Protocol (IP). Although not explicitly shown in FIG. 1, network 102 may include a variety of network devices, such as servers, routers, network switches, and/or other network hardware devices configured to transport data over the network 102.

The client 104 may include an instance and/or a client device. As such, client devices may include a variety of suitable devices, such as a desktop computer, a smartphone, one or more linked devices (e.g., smart watch, smart glasses, fitness tracker), a laptop, or a tablet. The client 14 may have access to the network 102 directly (e.g., through a specific virtual private network (VPN) connection) or indirectly (e.g., via a public network and with certain security protocols). During an access to a service provided via the network 102, the client's personal data (such as name, address, phone number, email address, age, username, password, account information) may be utilized (e.g., recorded, verified, processed, analyzed). For example, the client's personal data may provide information related to client devices and/or client instances being on an allow list, a deny list, and the like. In this manner, the client 104 may be classified for further actions performed by the system 100.

The system 100 may include a manifest manipulation system 106, a logging system 108, a quality assurance system 110 (e.g., QA system), a tracking server 112, an ad server 114, or a combination thereof. The manifest manipulation system 106, the logging system 108, the quality assurance system 110 (e.g., QA system), the tracking server 112, the ad server 114 may be communicatively coupled to the network 102, the client 104, and/or one or more additional suitable components. The manifest manipulation system 106 may include a communication component, a processor, a memory, a storage, input/output (I/O) ports, a display, and the like. The communication component may facilitate communication between the manifest manipulation system 106 and the client 104. Additionally, the communication component may facilitate data transfer to the manifest manipulation system 106, such that the manifest manipulation system 106 may provide and/or receive data from the logging system 108, the QA system 110, the tracking server 112, the ad server 114, or a combination thereof. The processor may be any type of computer processor or microprocessor capable of executing computer-executable code. The processor may also include multiple processors that may perform the operations described herein (e.g., the operations may be distributed between the multiple processors that together form processing circuitry, such that one processor performs one operation, another processor performs another operation, and so on). Indeed, the operations may be distributed between the processor and/or any other processor of the system 100 in any suitable manner.

The memory and the storage may be any suitable articles of manufacture that can serve as media to store processor-executable code, data, or the like. These articles of manufacture may represent computer-readable media (e.g., any suitable form of memory or storage) that may store the processor-executable code used by the processor to perform the presently disclosed techniques. The memory and the storage may also be used to store data described (e.g., privacy-related data, location data), various other software applications for analyzing the data, and the like. The memory and the storage may represent non-transitory computer-readable media (e.g., any suitable form of memory or storage) that may store the processor-executable code used by the processor to perform various techniques described herein. It should be noted that non-transitory merely indicates that the media is tangible and not a signal.

The display may operate to depict visualizations associated with software or executable code being processed by the processor. In certain aspects, the display may be a touch display capable of receiving inputs from a user of or to the system 100. The display may be any suitable type of display, such as a liquid crystal display (LCD), plasma display, or an organic light emitting diode (OLED) display, for example. Additionally, in certain aspects, the display may be provided in conjunction with a touch-sensitive mechanism (e.g., a touch screen) that may function as part of a control interface for to the manifest manipulation system 106. In some instances, a user interface of to the manifest manipulation system 106 may be presented on the display. It should be noted, the logging system 108, the QA system 110, the tracking server 112, and/or the ad server 114 may include communication components, processors, memory, storage, input/output (I/O) ports, displays, and the like as discussed above in reference to the manifest manipulation system 106.

In some aspects, the system 100 may include an application program interface (API) designed to provide, display, and/or receive inputs related to feedback data associated with the client 104. For example, in some aspects, the API may provide notification of problematic content, content requests, and/or content responses. As used herein, the term API may be defined as a communication protocol between the client 104 and a server or in other words an interface implemented by an application, which allows other applications to communicate with it. An API may include a set of functions, methods, classes, or protocols that an operating system, library, or service provides to support requests made by computer programs. For example, the API may be used to interface with the manifest manipulation system 106, the logging system 108, the quality assurance system 110 (e.g., QA system), the tracking server 112, the ad server 114, or a combination thereof. As such, the API may include a graphical user interface (GUI). The GUI may be used to receive queries associated with the client 104 and/or feedback data provided by one or more components of the system 100.

In some aspects, the manifest manipulation system 106 may receive one or more ad requests from the client 104 based on one or more manifests (e.g., playback manifests). In some aspects, the manifest manipulation system 106 may determine the client 104 associated with the ad requests may be indicated for logging. In some aspects, the manifest manipulation system 106 may include an upstream entity that may be between the client 104 and the ad server 112. In this manner, the upstream entity of the manifest manipulation system 106 may determine if the ad requests are indicated for logging. As such, the manifest manipulation system 106 may direct the ad requests to the logging system 108 via a redirector 116. In another aspect, the redirector 116 may be separate from the manifest manipulation system 106. The logging system 108 may log data associated with the ad requests and redirect the ad requests to the ad server 114. The ad request provided to the ad server 114 may include an indication to provide a response to the logging system 108.

The ad server 114 may receive the ad requests and generate one or more ad responses. The ad responses may be provided back to the logging system 108, where they are received and modified (e.g., manipulated) by the logging system 108 (e.g., to simulate being directly sourced from the ad server 112, to cause subsequent redirection of pixel tracking, etc.). The modified ad responses may be provided to the manifest manipulation system 106. The manifest manipulation system 106 may receive the modified ad responses and incorporate the modified ad responses (e.g., secondary media content/secondary media content locations and/or indicators) into the manifests. In some aspects the ad responses may not be modified by the logging system 108 prior to submission to the manifest manipulation system 106. The manifest manipulation system 106 may direct the manifest to the client 104 for playback.

In certain aspects, the modified ad request generated by the logging system 108 and integrated within the manifest by the manifest manipulation system 106 may include one or more tracking pixels with a specified response tracker URL. As will be discussed in more detail below, pixel tracking may be redirected to the logging system 108 (and away from an advertiser-specified pixel server), enabling the logging system 108 to track details of the pixel tracking. The logging system 108 may generate a modified ad response tracker URL specifying a target tracking event location to the logging system 108. For example, the tracking pixels may trigger one or more pixel events upon playback of the manifest by the client 104. The pixel events may transmit tracking information (e.g., a session identifier, ad server transaction identifier, etc.) to the logging system 108 based on the modified ad response tracker URL. The logging system 108 may extract data from the pixel events and provide the data to the QA system 110. The logging system 108 may then redirect the client 104 to provide the tracking information of the pixels events to the tracking server 114 associated with the ad server 112, resulting in transmission of the tracking information to the intended tracking server 114. The QA system 110 may analyze the data to provide near real time debugging and diagnostics.

As discussed herein, the manifest manipulations provided by the manifest manipulation system 106 may generate new manifest outputs based upon one or more manifest inputs. Among other things, the manifests described herein may be provided be one or more content sources. The content sources may provide manifests with segment indications of the associated content, such as a location indication of the associated content segments and playback timings for these segments. For example, the location indication may point to the associated content segments in a datastore (e.g., a Content Distribution Network (CDN)) where the content sources have stored the content. In some aspects, the manifest may include blocks of timings where secondary media content (e.g., advertisements) may be inserted into a playback schedule. For example, the manifest manipulation system 106 may be used to modify this secondary media content response provided by the ad server 114. As may be appreciated, the manifest manipulation system 106 and distribution techniques described herein provide quality assurance and data for diagnostics in content distribution.

Figure 2:
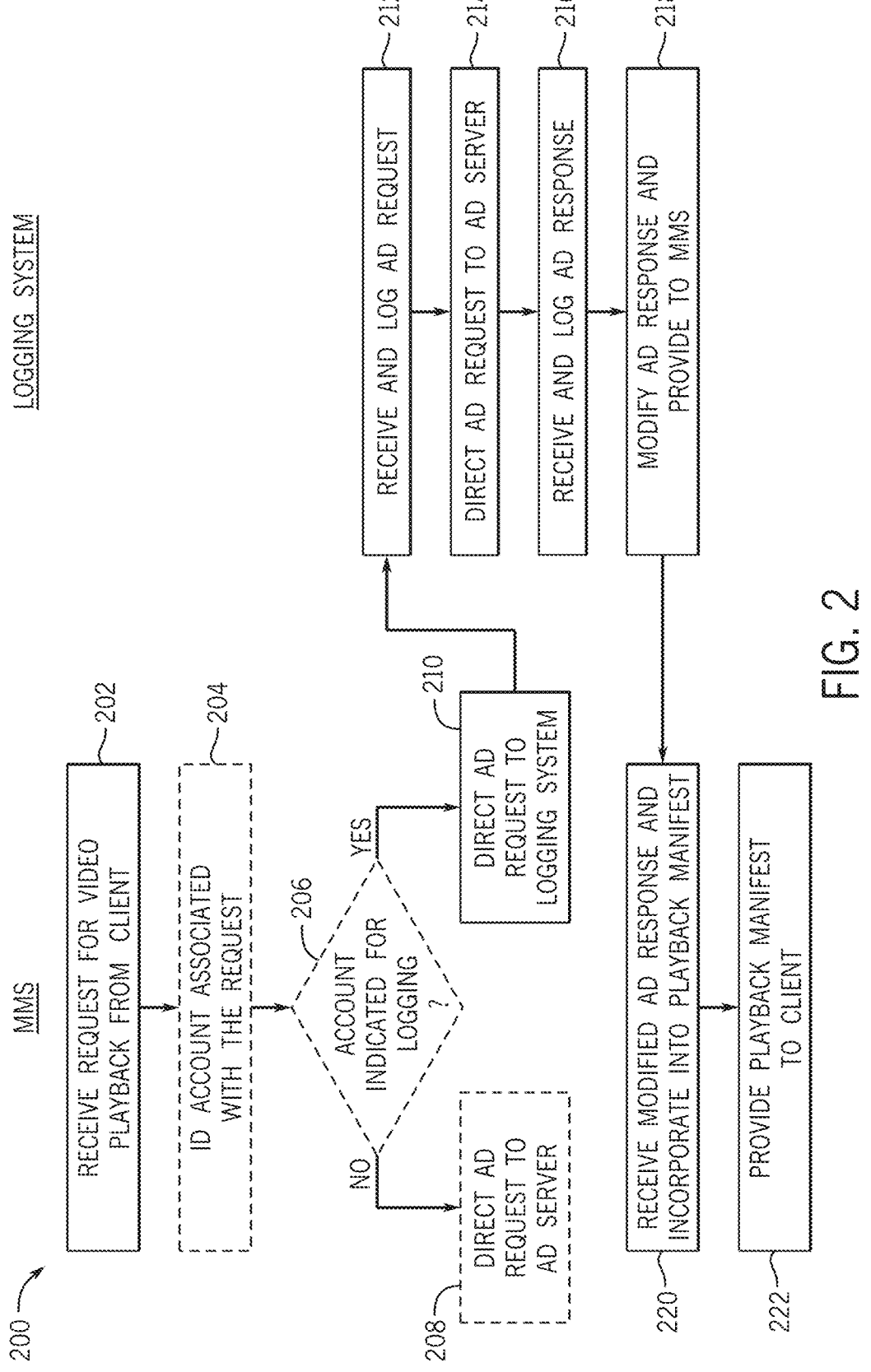
FIG. 2 is a flowchart, illustrating a process for generating and providing a playback manifest to a client including the manifest manipulation system, in accordance with certain aspects of the current application.
Figure 3:
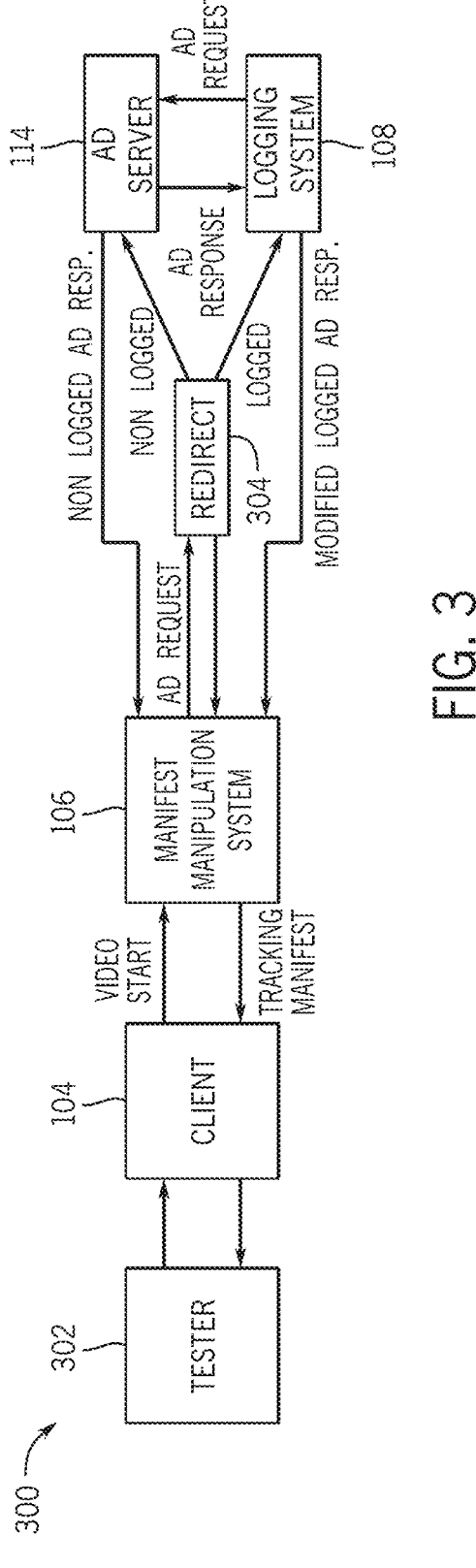
FIG. 3 is a block diagram, illustrating a process for implementing the manifest manipulation system, in accordance with certain aspects of the current application.

FIG. 2 is a flowchart illustrating a process 200 for generating and providing a playback manifest to a client including the manifest manipulation system 106, in accordance with certain aspects of the current application. FIG. 3 is a block diagram, illustrating a manifest manipulation approach 300 for modifying the playback manifest, in accordance with certain aspects of the current application. For clarity, these figures will be discussed together. The process 200 may be performed a computing device, a controller, or any other suitable computing device(s) or controller(s). Furthermore, the blocks of the process 200 may be performed in the order disclosed herein or in any suitable order. For example, certain blocks of the process 200 may be performed concurrently. In addition, in certain aspects, at least one of the blocks of the process 200 may be omitted. Further, it should be noted, that the manifest manipulation system 106 and/or the logging system 108 may iteratively perform the blocks outlined in process 200.

At block 202 of the process 200, the manifest manipulation system 106 may receive one or more requests for video playback from the client 104. In some aspects, the one or more requests for video playback may include one or more requests for secondary media content (e.g., ad requests). For example, the client 104 may send a request to stream a gameshow. In some instances, the playback manifest associated with the gameshow may include ad segments. As such, as the playback approaches an ad segment, the client 104 may send a request for secondary media content (e.g., advertisements) to stream during the ad segments. As such, the request (e.g., ad request) may be sent over the network 102 and provided to the manifest manipulation system 106. In some instances, the ad request may be associated with a particular client to provide insight related to ad response.

At block 204 of the process 200, the manifest manipulation system 106 may identify an account associated with the requests for secondary media content. The account may be associated with the client 104 and may be identified based on a username, a user identification, one or more user preferences, and/or other suitable designations associated with the account. At block 204, the manifest manipulation system 106 may determine if the account is indicated or flagged for logging. Indication of logging may be based on information extracted from the account. For example, an account may be designated based on the user preferences to be on an allow list and/or a deny list. The allow list may be indicative of requests that may be identified for redirection (e.g., manipulation, modification) by the manifest manipulation system 106 (e.g., for logging purposes). For example, users of the content provider may agree to use of the manifest manipulation system 106 to increase a quality of streaming of content. In some aspects, the deny list may indicate that the requests may be sent directly to the ad server 114. That is, the deny list may be used when the ad request is not identified for tracking and/or modification.

At block 206 of the process 200, the manifest manipulation system 106 may evaluate if the account is indicated for logging. In some instances, the manifest manipulation system 106 determines that the account is not indicated for logging and the process 200 may proceed to block 208. At block 208, an ad request may be directed to the ad server 114. As such, the ad server 114 may provide one or more ad responses to the client 104. That is, the ad server 114 may provide ad responses to the client 104 that may be used in the playback manifest during the ad segments.

In some aspects, the manifest manipulation system 106 may determine that the account is indicated for logging. As such, the process 200 may proceed from block 206 to block 210. At block 210, the manifest manipulation system 106 may modify the ad request and direct the ad request to the logging system 108. The ad request may be redirected to the logging system 108 via the redirector 116. The redirector 116 may modify a URL to direct the ad request to the logging system 108.

As illustrated in FIG. 3, in some aspects, a tester 302 may provide a prompt to the client 104 to generate requests for video playback. As such, upon receipt of the ad request, the manifest manipulation system 106 may initiate a redirect 304 of the ad request based on the username, the identifier, the preferences, and/or additional designations associated with the account. In this manner, when the account is associated with an unlogged session (e.g., an account on the deny list) the manifest manipulation system 106 may direct the request to the ad server 114. In some aspects, the manifest manipulation system 106 may determine the account is associated with a logged session (e.g., an account on the allow list) and may modify the ad request to direct the ad request to the logging system 108. The logging system 108 may log information associated with the ad request and redirect the ad request to the ad server 114. The ad server 114 may generate one or more ad responses based on the modified ad request and provide the one or more ad responses to the logging system 108 and/or the manifest manipulation system 106.

Returning now to FIG. 2, at block 212 of the process 200, the logging system 108 may receive and log the ad request. Logging of the ad request may include recording certain data associated with the ad request. For example, the data may include a type of request, one or more content tags, metadata associated with content tags (e.g., tag URL, start date, advertiser, etc.), start and end time of content, and the like associated with a particular segment (e.g., ad segment) of the playback manifest. That is, the playback manifest may include various ad segments that may be filled (e.g., secondary media content provided) by responses to the ad requests. As such, a type of segment associated with the ad segments may be logged by the logging system 108.

At block 214 of the process 200, the logging system 108 may direct the ad request to the ad server 114. The ad server 114 may be a third-party digital video ad service provider (e.g., FreeWheel). As such, the ad server 114 may generate one or more ad responses based on the ad request. For example, the ad request may specify a playback length for the ad segment. In this manner, the ad response may identify one or more secondary media content associated with a playback manifest corresponding to the playback length. In some aspects, the ad response may include a content file. The content file may contain an indication of one or more pieces of content and may include information about the content regarding bit rate, pixel size, duration, resolution, and so forth. The content file is a data structure that may use an XML format and/or a JSON format to describe one or more pieces content to be displayed. In some aspects, the content file of the ad response may include a video ad serving template (VAST). The VAST may include ad tags, metadata, and the like represented by a HTTP based URL. As such, the VAST may provide information related to secondary media content to be played and/or tracking associated with playing the secondary media content.

In some aspects, the ad response may include one or more tracking pixels associated with the secondary media content. As used herein, a tracking pixel may be a computer-interpretable snippet of code that collects information about the client 104 on the content presentation service. The tracking pixels from the ad server 114 may be associated with a particular domain (e.g., vendor.com) that identifies a vendor associated with the tracking pixel. The tracking pixels may be found in the XML of the content file (e.g., VAST) via quartile pixels, default impressions, click through events, mute or unmute features, and so forth. In some aspects, click through events may track clicks on a specific link and/or viewing of secondary media content associated with the ad response. Tracking pixels may be snippets of code that collect information about users on the content presentation service (e.g., how users watch ads, type of ads users click on). In some instances, tracking pixels may include research and tracking pixels added as additional tracking pixels in the content file. In particular, tracking pixels from the ad server 114 may be located in an impression line or towards the bottom of the XML of the content file associated with the ad response in an extension type field.

At block 216 of the process 200, the logging system 108 may receive and log the ad response. In some aspects, the logging system 108 may log certain data associated with the ad response. For example, the logging system 108 may log an ad response tracker URL, a domain name, a content type, a name, a content identifier, tracking pixels, and/or other suitable pieces of data provided by the ad response. As such, the logging system 108 may store information associated with the ad response.

At block 218 of the process 200, the logging system 108 modifies the ad response and provides the modified ad response to the manifest manipulation system 106. It should be noted that in some aspects, the manifest manipulation system 106 may modify the ad response. Modification of the ad response may include modifying an ad response tracker URL. For example, modification of the ad response tracker URL may direct the ad response to provide feedback data associated with playback to the logging system 108, such that the logging system 108 may log pixel tracking data associated with the ad response. That is, the modified ad response tracker URL may redirect feedback data to the logging system 108 instead of directly to the tracking server 114 upon playback. For example, the modified ad response may include an updated domain name and/or URL that may direct feedback data from the client 104 or the content presentation service to logging system 108. As such, the modified ad response may include the content file provided by the ad server 112 and the modified ad response tracker URL. For example, the ad server 112 may provide a particular ad response to the logging system 108. The logging system 108 may modify the domain name associated with the ad response while maintaining (e.g., not modifying) additional elements of the content file. As such, the modified ad response may still include original elements provided from the ad server 112, such that the original tracker URL may be reconstituted. The modified ad response may be directed to the manifest manipulation system 106 for inclusion in the playback manifest.

With this in mind, at block 220 of the process 200, the manifest manipulation system 106 may receive the modified ad response and incorporate one or more elements of the modified ad response into the playback manifest. In some aspects, incorporation of the modified ad response into the playback manifest may include merging content contained in the ad response into a corresponding ad segment of the playback manifest At block 222 of the process 200, the manifest manipulation system 106 provides the playback manifest to the client 104. In some aspects, the playback manifest may be executed by the client 104, such that content fragments indicated within the manifest may be retrieved and played back on the client 104. Upon playback, the client 104 may generate feedback data that is directed to the logging system 108. This process is described in more detail with reference to FIGS. 4 and 5.

Returning to FIG. 3, the ad server 114 may generate the ad response and provide the ad response to the manifest manipulation system 106. In some aspect, the manifest manipulation system 106 may manipulate (e.g., modify) the ad response. Further, the manifest manipulation system 106 may update the playback manifest. In this manner, the playback manifest may include one or more elements of the modified ad response. The playback manifest may be provided to the client 104. In some aspects, the client 104 may run the playback manifest and retrieve the ad based on the modified ad response. The tester 302 may view the playback manifest, the modified ad response, or a combination thereof. In some aspects, the modified ad response may include one or more tracking pixels. The tracking pixels may provide information associated with playback of the ad segment to the manifest manipulation system 106, the logging system 108, the QA system 110, or a combination thereof.

Figure 4:
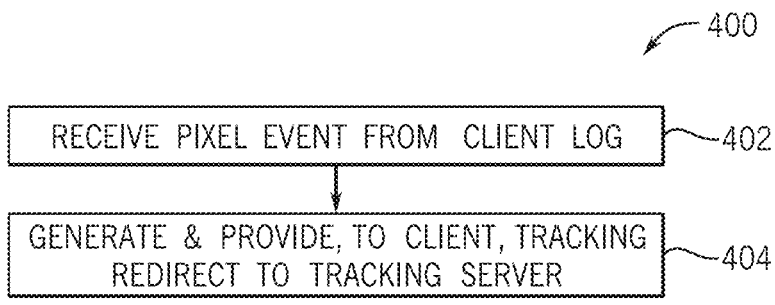
FIG. 4 is a flowchart, illustrating a process for receiving and redirecting pixel events from a client, in accordance with certain aspects of the current application.

With this in mind, FIG. 4 is a flowchart, illustrating a process 400 for receiving and redirecting pixel events from the client 104, in accordance with certain aspects of the current application. The process 400 may be performed a computing device, a controller, or any other suitable computing device(s) or controller(s). Furthermore, the blocks of the process 400 may be performed in the order disclosed herein or in any suitable order. For example, certain blocks of the process 400 may be performed concurrently. In addition, in certain aspects, at least one of the blocks of the process 400 may be omitted. Further, it should be noted, that the manifest manipulation system 106 and/or the logging system 108 may iteratively perform the blocks outlined in process 400.

At block 402 of the process 400, the logging system 108 receives and logs a pixel event from the client 104. The pixel event may be based on playback and/or interaction of the ad within the playback manifest. The pixel event may include pixel tracking based on content views, sign-ups, purchases, playback speeds, default impressions, click through events, mute or unmute features, and the like. As such, the logging system 108 may log feedback data associated with the pixel event. It should be noted, that modification of the ad response directs the pixel event to the logging system 108. That is, the pixel event is not initially directed to the tracking server 114 associated with the ad server 112. In this manner, direction of the pixel events to the logging system 108 may reduce a latency associated with generating analytics from pixel events received and logged by the tracking server. In some aspects, the logging system 108 may provide analytic data associated with the logging of the pixel event to the QA system 110. As such, the QA system 110 may be used to analyze the pixel event and update one or more pieces of content and/or provide data associated with the playback manifest. It should be noted, that multiple pixel events may be received and logged by the logging system 108 simultaneously and/or concurrently. As such, feedback data associated with the multiple pixel events may be extracted for use in analytics. In some instances, analytics may be generated in near real-time with manifest playback.

At block 404 of the process 400, the logging system 108 generates and provides to the client 104 a tracking redirect to the tracking server 114. The tracking redirect may include a 302 redirect. The 302 redirect may include a redirect URL associated with tracking server 114 (e.g., associated with the ad server 112). As mentioned above, the redirect URL may be reconstituted from tracking information of the tracking event provided to the logging system 108. As such, in some instances, the client 104 may receive the 302 redirect and transmit the pixel event to the tracking server 114. For example, the logging system 108 may formulate the tracking redirect to direct the pixel event to an URL associated with the ad response prior to modification. As such, the pixel event may provide feedback data to the tracking server 114 and the logging system 108. In some instances, the tracking server 114 may use analytics extracted from the feedback data to optimize ad responses and/or monitor playback features associated with the ad response.

Figure 5:
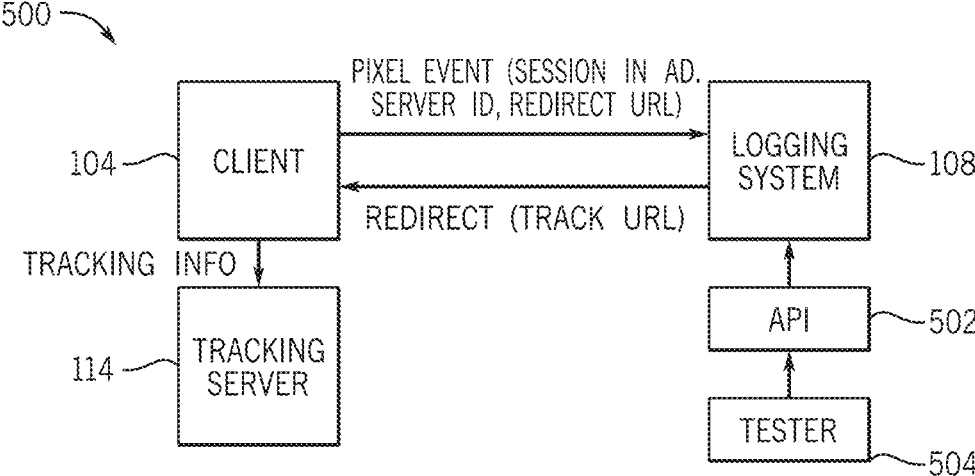
FIG. 5 is a block diagram, illustrating a process for handling pixel events including an application programming interface (API), in accordance with certain aspects of the current application.

FIG. 5 is a block diagram, illustrating a process 500 for handling pixel events including an application programming interface (API) 502, in accordance with certain aspects of the current application. The client 104 may process the playback manifest provided by the manifest manipulation system 106 and generate one or more pixels events. In an aspect, the one or more pixel events may be generated in response to playing back a content fragment indicated by the playback manifest. The pixel events may be directed to the logging system 108 (e.g., based upon the modified ad response tracker URL). The logging system 108 may receive and log the pixel events associated with the modified ad response. The logging system 108 may formulate the tracking redirect from tracking information of the pixel event that is provide to the logging system 108. As such, a redirection command corresponding to the pixel events may be directed back to the client 104, instructing redirection to the tracking server 114. The client 104 may receive the tracking redirect and direct the pixel events to the tracking server 114. In this manner, the tracking server 114 may receive and log feedback data associated with the pixel events. The tracking server 114 may be associated with the ad server 112 and may operate as if the pixel events were not received and logged by the logging system 108. That is, operation of the ad server 112 and/or the ad server 114 may be uninterrupted upon ad response modification and pixel event redirect. In this manner, the publisher associated with the content presentation service may continue to collect analytics associated with the pixel events to generate independent analysis of the secondary content. In this manner, quality control checks of the secondary media content may be generated to evaluate the ad request process and the quality of ad segments when integrated on the content presentation service.

With the foregoing in mind, in some aspects, logging system 108 may directly provide an enterprise with feedback data associated with secondary media content playback. In this way, a tester 504 may access the feedback data received and logged by the logging system 108 via the API 502. The API 502 may be used by the tester 504 to access the feedback data to improve a quality of future ad response and/or track data associated with client playback of the modified ad response. As such, the tester 504 may output feedback data via the API 502 to the QA system 110. The QA system 110 may be used to identify and/or diagnose bugs associated with the ad requests and/or the ad responses. In this manner, limitations associated with receiving feedback data directly from the tracking server 144 may be overcome.

Figure 6:
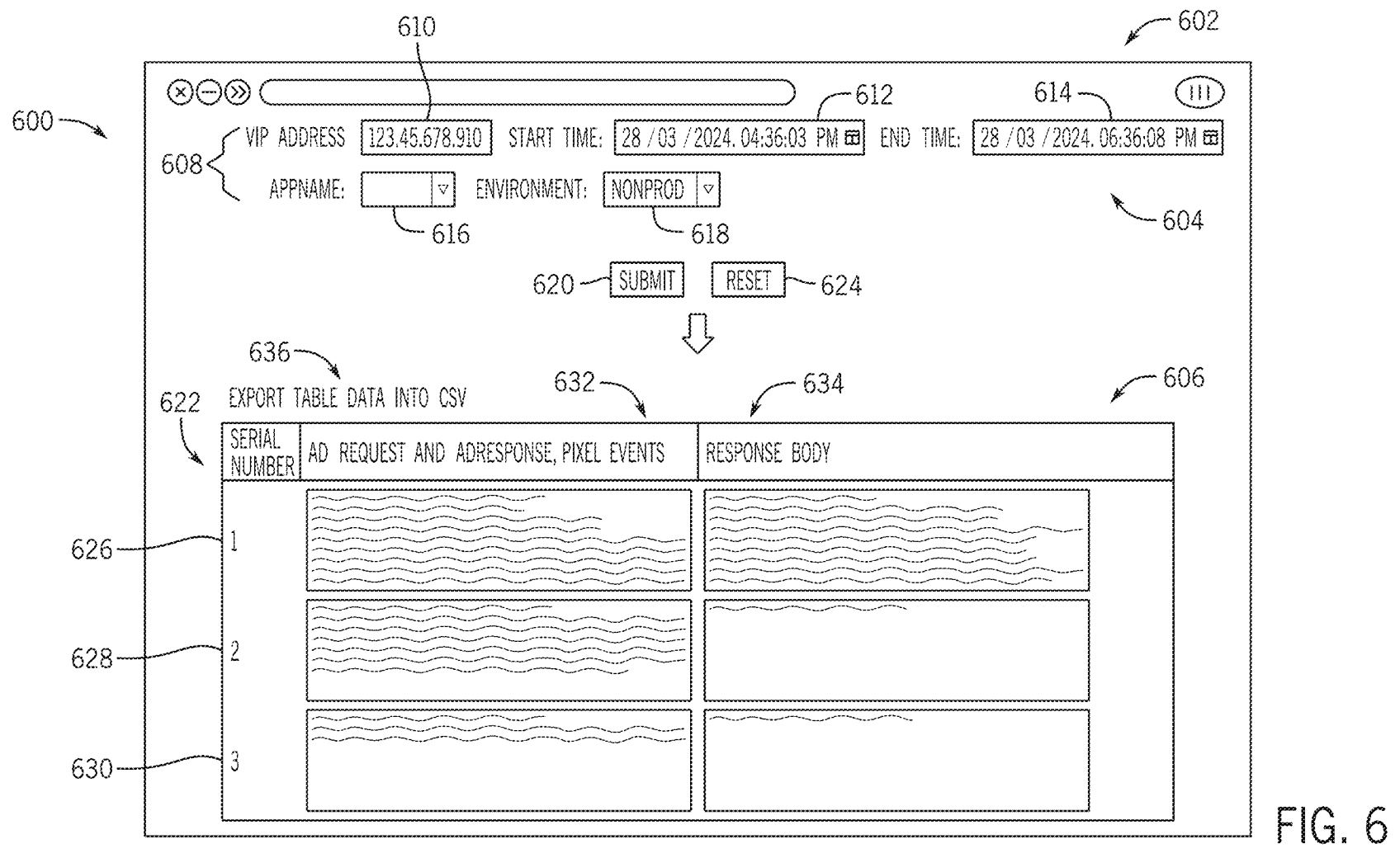

FIG. 6 is a schematic aspect of a graphical user interface (GUI) of the API 502 of FIG. 5 depicted as displayed on a screen 602. In general, the screen 602 of the GUI may allow the tester 504 to preview feedback data, export feedback data, query feedback data, or a combination thereof. In this manner, the screen 602 may provide a query widget 604, a feedback data widget 606, or one or more additional widgets (e.g., an access time widget). For example, the access time widget may provide an access time parameter associated with a playback time of the secondary media content. As shown, the query widget 604 of the GUI may allow the tester 504 to select, view, and/or manage one or more content parameter fields 608 deployed by the API 502 of the manifest manipulation system 106. The content parameter fields 608 may include information associated with the ad requests, ad responses, and/or event pixels. As such, the feedback data widget 606 of the GUI may display feedback data associated with outputs of the content parameter fields 608 such as, ad requests, ad responses, and/or pixel events.

In some aspects, the content parameters fields 608 of the query widget 604 may include a VIP address 610, a start time 612, an end time 614, and application name 616, an environment 618, and the like. The VIP address 610 may include a dynamic IP address that may be associated with the network 102 associated with the client 104. As such, querying by the VIP address 610 may provide information about a particular network. Further, the start time 612 and the end time 614 may query feedback data associated with a particular playback time associated with the playback manifest. As such, the feedback data may be filtered to output data collected within a time frame within the start time 612 and the end time 614. The Application name 616 may filter feedback data output based on a particular content presentation service. That is, the logging system 108 may receive and log pixel data from various content presentation services and collate the feedback data to provider querying via the GUI of the API 502. The environment 618 may be input into the query widget 604 to direct an output of the query widget 604 to provide feedback data associated with a particular environment (e.g., software system and/or hardware system). It should be noted that in some instances fewer and/or additional content parameter fields 608 may be included in the query widget 604 of the GUI.

In certain aspects, query widget 604 may output feedback data to the feedback data widget 606. Upon input of the content parameters fields 608 a submit button 620 may be selected by the tester 504. As such, the feedback data may be populated within a table 622 of the feedback data widget 606. In some instances, a reset button 624, may be selected within the query widget 604 to allow one or more additional queries to be input. The feedback data provided as the output of the query widget 604 ma include one or more inputs 626, 628, 630 associated with ad requests, ad responses, pixel events, and the like. For example, a particular ad request may generate in a first column 632 of the table 622 and a response body may generate in a second column 634 of the table 622. As such, the tester 504 may select an export button 636 to export feedback data within the table 622 to a. CSV file.

In some aspects, the exported feedback data may be provided by the manifest manipulation system 106 to the QA system 110. In this manner, the QA system 110 may generate analytics associated with a quality assurance of the playback manifest. Specifically, the QA system 110 may assess a quality of the ad response within a particular ad segment of the playback manifest. In some instances, the QA system 110 may determine that a playback quality of the particular ad segment may not meet a quality threshold (e.g., playback speed, load speed, and the like) and direct the content presentation service to restrict ad responses based on the quality threshold. In this manner, the manifest manipulation system 106, the logging system 108, and the QA system 110 may be used to provide reliable secondary media content for playback on the content presentation service.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A computer-implemented method comprising:
receive an ad request from a client device;
determine if the client device is indicated for logging;
in response to determining that the client device is indicated for logging:
intercepting, via a logging system, the ad request intended for an ad server;
logging, via the logging system, data associated with the ad request;
submitting the ad request to the ad server;
receiving, from the ad server, an initial ad response based on the ad request; and
providing, to the client device, a second ad response different from the initial ad response received from the ad server; and
in response to determining that the client device is not indicated for logging, submitting the ad request directly to the ad server.

2. The computer-implemented method of claim 1, comprising:
logging the initial ad response, wherein the second ad response is provided to the client device via a manifest manipulation system configured to incorporate a portion of the initial ad response into a content playback manifest of the client device.

3. The computer-implemented method of claim 1, comprising determining that the client device is indicated for logging by identifying that an account being used by the client device is on a list indicating that the account should be logged.

4. The computer-implemented method of claim 1, comprising:
modifying the initial ad response to cause a tracking pixel event to be directed to the logging system; and
provide, to the client device, the second ad response that is different from the initial ad response from the ad server.

5. The computer-implemented method of claim 4, wherein modifying the initial ad response comprises modifying a domain name of a tracking server provided in a tracking pixel of the initial ad response.

6. The computer-implemented method of claim 4, comprising:
receiving, at the logging system, a pixel event response, wherein the pixel event response comprises feedback data associated with playback of content associated with the second ad response; and
logging the feedback data.

7. The computer-implemented method of claim 6, comprising:
generating a redirect command requesting the client device to provide the pixel event response to a tracking server; and
providing the redirect command to the client device.

8. The computer-implemented method of claim 6, wherein determining that the client device is not indicated for logging comprises:
identifying that an account being used by the client device is not on a list indicating that the account should be logged; and
providing, to the client device, the second ad response that is unmodified from the initial ad response from the ad server.

9. A system, comprising:
processing circuitry; and
memory, accessible by the processing circuitry, storing instructions that, when executed by the processing circuitry, cause the processing circuitry to perform operations comprising:
receiving, via a logging system, an ad request intended for an ad server;
logging, via the logging system, data associated with the ad request;
submitting the ad request to the ad server;
receiving, from the ad server, an initial ad response based on the ad request, wherein the initial ad response comprises a tracking pixel directed to a tracking server; and
providing, to a client device, a second ad response different from the initial ad response received from the ad server, wherein the second ad response is configured to redirect a tracking pixel event of the tracking pixel to the logging system by modifying the initial ad response.

10. The system of claim 9, wherein the processing circuitry performs operation comprising:
providing the second ad response to the client device via a manifest manipulation system configured to incorporate a portion of the second ad response into a content playback manifest of the client device.

11. The system of claim 10, wherein the manifest manipulation system is configured to:
receive a content request from the client device;
identify an account associated with the content request;
determine if the account associated with the content request is indicated for logging;
in response to the account being indicated for logging, submit the content request to the logging system in lieu of the ad server; and
in response to a second account being indicated as not for logging, direct a second ad request of the second account to the ad server directly.

12. The system of claim 10, wherein the manifest manipulation system is configured to:

identify the tracking pixel in the initial ad response;

modifying the initial ad response generating the second ad response; and provide the second ad response for incorporation into the content playback manifest of the client device.

13. The system of claim 12, wherein the second ad response comprises a modified domain name or a modified URL tracker.

14. The system of claim 9, wherein the processing circuitry performs operation comprising:

receiving a pixel event response, wherein the pixel event response comprises feedback data associated with playback of the second ad response;

logging the feedback data; and providing a redirect command to the client device, requesting the client device to redirect the pixel event response to a tracking server.

15. A tangible, non-transitory, computer-readable storage medium, comprising computer-readable instructions that, when executed by one or more processors of one or more computers, cause the one or more computers to:

intercept, via a logging system, an ad request to be satisfied by an ad server;

log, via the logging system, data associated with the ad request;

submit the ad request to the ad server;

receive, from the ad server, an initial ad response based on the ad request;

log the initial ad response;

generate a second ad response by modifying the initial ad response to cause a tracking pixel event to be directed to the logging system; and provide, to a client device, the second ad response.

16. The tangible, non-transitory, computer-readable storage medium of claim 15, comprising computer-readable instructions that, when executed by the one or more processors of the one or more computers, cause the one or more computers to:

forward the initial ad response to a client device providing the ad request.

17. The tangible, non-transitory, computer-readable storage medium of claim 16, comprising computer-readable instructions that, when executed by the one or more processors of the one or more computers, cause the one or more computers to:

modify the initial ad response, by adjusting a domain name or URL of the tracking pixel of the initial ad response to cause the tracking pixel event associated with the tracking pixel to be provided to the logging system.

18. The tangible, non-transitory, computer-readable storage medium of claim 17, comprising computer-readable instructions that, when executed by the one or more processors of the one or more computers, cause the one or more computers to:

forward the modified ad response to the client device, by causing the modified ad response to be incorporated in a manifest to be provided to the client device.

19. The tangible, non-transitory, computer-readable storage medium of claim 15, comprising computer-readable instructions that, when executed by the one or more processors of the one or more computers, cause the one or more computers to:

receive the ad request from a client device; and determine if the client device is indicated for logging.

20. The tangible, non-transitory, computer-readable storage medium of claim 19, comprising computer-readable instructions that, when executed by the one or more processors of the one or more computers, cause the one or more computers to:

in response to determining that the client device is indicated for logging, intercept, via the logging system, the ad request to be satisfied by the ad server; and in response to determining that the client device is not indicated for logging, submitting the ad request directly to the ad server.

\* \* \* \* \*